(12) United States Patent
Garrity

(10) Patent No.: US 10,547,727 B2
(45) Date of Patent: Jan. 28, 2020

(54) WIRELESS HEADSET

(71) Applicant: Garrity Power Services LLC, Rockwall, TX (US)

(72) Inventor: Paul Garrity, Rockwall, TX (US)

(73) Assignee: Garrity Power Services LLC, Rockwall, TX (US)

( * ) Notice: Subject to any disclaimer, the term of this patent is extended or adjusted under 35 U.S.C. 154(b) by 0 days.

(21) Appl. No.: 15/903,658

(22) Filed: Feb. 23, 2018

(65) Prior Publication Data

US 2018/0248988 A1  Aug. 30, 2018

Related U.S. Application Data

(60) Provisional application No. 62/462,930, filed on Feb. 24, 2017.

(51) Int. Cl.
*H04M 1/60* (2006.01)
*H02J 50/27* (2016.01)
*H04M 1/05* (2006.01)

(52) U.S. Cl.
CPC ........... *H04M 1/6066* (2013.01); *H02J 50/27* (2016.02); *H04M 1/05* (2013.01); *H04M 2250/02* (2013.01); *H04R 2201/107* (2013.01); *H04R 2420/07* (2013.01)

(58) Field of Classification Search
CPC .. H04M 1/6066; H04M 1/05; H04M 2250/02; H04R 13/00; H04R 2201/107; H04R 2420/07; H02J 50/27

USPC ............ 455/41.1–41.3, 575.2, 573; 381/3, 6, 381/21.1, 71.11, 71.7, 74, 79.15, 152, 163
See application file for complete search history.

(56) References Cited

U.S. PATENT DOCUMENTS

| | | | | |
|---|---|---|---|---|
| 3,984,706 | A * | 10/1976 | Inouye ................. | G11B 5/5521 310/12.08 |
| 5,894,263 | A * | 4/1999 | Shimakawa ............. | G08B 6/00 340/384.1 |
| 9,853,458 | B1 * | 12/2017 | Bell ........................ | H02J 5/005 |
| 9,936,301 | B1 * | 4/2018 | Asfaw .................... | H04R 9/025 |
| 2003/0115395 | A1 * | 6/2003 | Karcher ................ | G06F 1/1632 710/303 |
| 2007/0032274 | A1 * | 2/2007 | Lee ....................... | H04R 1/1025 455/575.2 |
| 2012/0308060 | A1 * | 12/2012 | Pontoppidan ........ | H04R 25/505 381/317 |
| 2017/0179730 | A1 * | 6/2017 | Gao ....................... | H02J 5/005 |

\* cited by examiner

*Primary Examiner* — Edward F Urban
*Assistant Examiner* — Angelica M Perez
(74) *Attorney, Agent, or Firm* — Hovey Williams LLP

(57) ABSTRACT

A wireless headset comprising a sound transducer, said sound transducer and a wireless power receiver. The sound transducer comprises a sound transducer coil configured to at least one of convert a first electrical signal to a first sound signal and convert a first sound signal to a first electrical signal comprising first audio information. The wireless power receiver is configured to receive wireless power through an antenna comprising said sound transducer coil.

19 Claims, 11 Drawing Sheets

WIRELESS HEADSET

RELATED APPLICATIONS

The present application is a non-provisional patent application and claims priority benefit, with regard to all common subject matter, of earlier-filed U.S. Provisional Patent Application Ser. No. 62/462,930, filed Feb. 24, 2017, titled "WIRELESS HEADSET", incorporated by reference herein in its entirety.

BACKGROUND

Wireless headsets are commonly used with a computer, phone, tablet, or music system to provide focused audio support without inhibiting flexibility of motion of the user. These wireless headsets typically employ lithium ion batteries that need to be charged periodically. Charging is typically accomplished by plugging one end of a USB cord (or micro or mini USB cord) into the headset and the other end into a USB charger. This is inconvenient and results in connector wear-out from repeated cycles of plugging and unplugging the USB cord.

Wireless headsets typically use Bluetooth® to transmit and receive audio information and sometimes use Bluetooth® Smart (BLE) to transmit and receive metadata and other data. Bluetooth® functions well to provide an audio link for voice transmission; however, it provides relatively poor-quality audio information for music. Furthermore, Bluetooth® uses 2.4 GHz radio frequency. Radio energy at 2.4 GHz may be absorbed by water in the human body and so performance degrades when the transmitter and the headset receiver are located on opposite sides of a person.

A further drawback of conventional wireless headsets is the possibility of running out of battery power during use. Wireless charging would eliminate these drawbacks; however, the small available area of most headsets negates the possibility of adding conventional wireless power receiving antennas. Conventional wireless charging systems also do not solve the problem of running out of battery power during wireless headset use.

SUMMARY OF THE INVENTION

These and other problems are generally solved or circumvented, and technical advantages are generally achieved, by advantageous embodiments of the present invention, including a wireless headset comprising a sound transducer and a wireless power receiver. The sound transducer has a sound transducer coil configured to convert a first electrical signal to a first sound signal and/or to convert a first sound signal to a first electrical signal comprising audio information. The wireless power receiver includes an antenna comprising said sound transducer coil such that the wireless power receiver receives wireless power through the antenna via the sound transducer coil.

In one embodiment, the wireless headset further comprises a receiver configured to receive a modulated signal through the antenna. In another embodiment, the sound transducer comprises a permanent magnet and a magnetic flux path through the permanent magnet and the sound transducer coil such that the magnetic flux path is closed through a ferrite material that is configured to saturate due to flux created by the permanent magnet.

In another embodiment, the sound transducer comprises a first radially-magnetized permanent magnet with a cross-section located within the inner circumference of the sound transducer coil and a second radially-magnetized permanent magnet with a cross-section surrounding the sound transducer coil such that the magnetic polarity of the first permanent magnet's outer circumference has opposite polarity of the second permanent magnet's inner circumference. The first and second permanent magnets may be affixed to a non-conductive, non-ferromagnetic structure.

In another embodiment, a wireless headset system comprises a wireless headset and a wireless transmitter. The wireless headset includes a sound transducer and a wireless power receiver. The sound transducer includes a sound transducer coil configured to convert a first electrical signal to a first sound signal comprising first audio information. The wireless power receiver includes an antenna comprising the sound transducer coil and receives wireless power transmitted from the wireless transmitter through the antenna via the sound transducer coil.

The above-described invention provides several advantages. For example, the wireless headset and wireless headset system do not wear out from charging and do not run out of power during use. The wireless headset does not need a large antenna and operates at frequencies that do not have degraded performance due to the proximity of users and other external interference.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Embodiments of the present invention are described in detail below with reference to the attached drawing figures, wherein.

Figure 1:
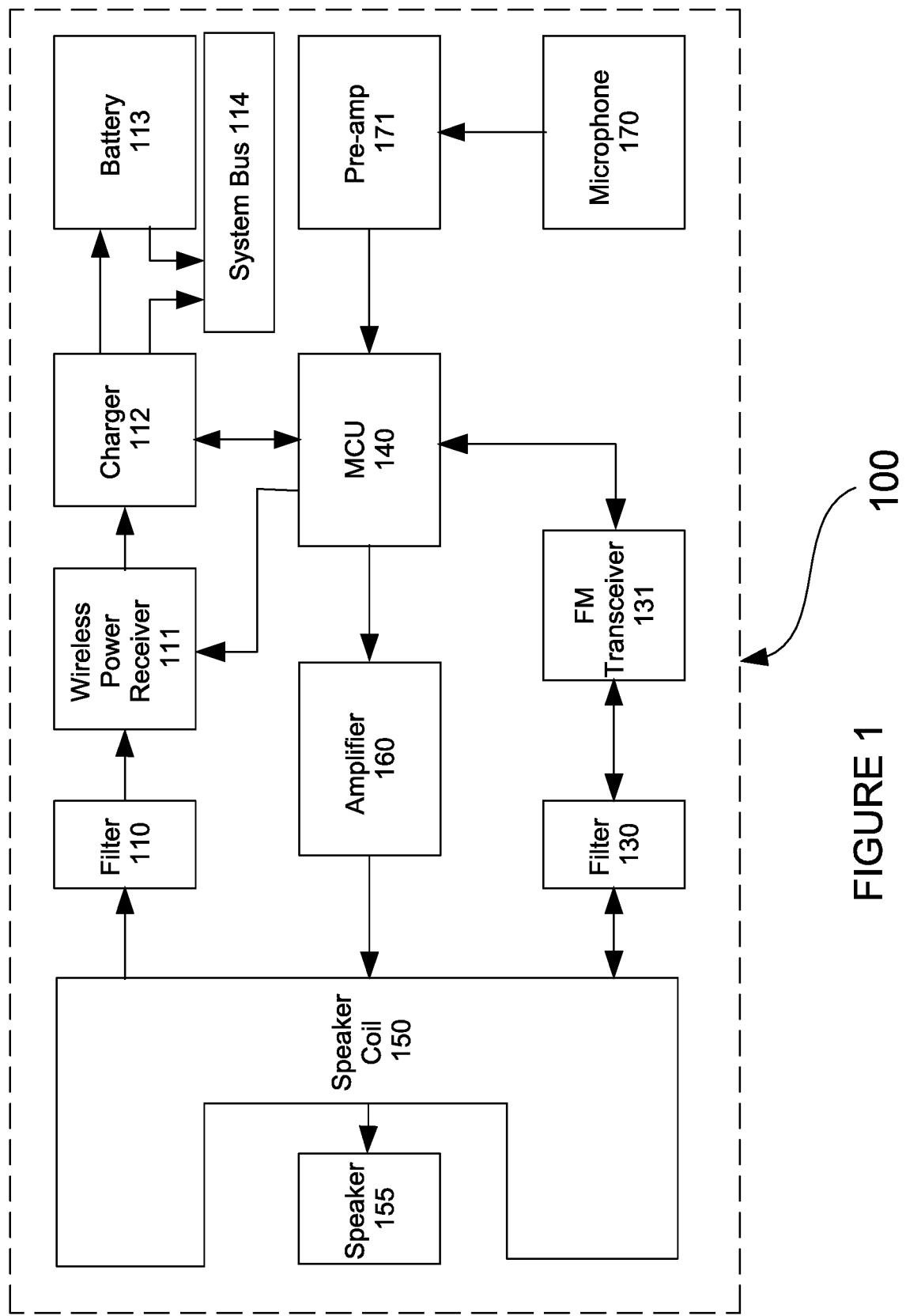
FIG. 1 is a schematic diagram of a wireless headset constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The present invention will be described with respect to exemplary embodiments in a specific context, namely, a wireless headset, and methods of operating and forming the same. While the principles of the present invention will be described in the context of a wireless headset, any application that may benefit from wireless transfer of power is well within the broad scope of the present invention.

Turning now to FIG. 1, illustrated is a schematic diagram representing an embodiment of a wireless headset 100 comprising Speaker Coil 150, Speaker 155, Filter 110, Wireless Power Receiver 111, Charger 112, Battery 113, System Bus 114, Micro Controller Unit (MCU) 140, Filter 130, Frequency Modulated (FM) Transceiver 131, Microphone 170, Pre-amplifier 171, and Amplifier 160.

Speaker Coil 150 is configured to function as part of speaker 155. That is, Speaker Coil 150 is configured to produce movement of a diaphragm to create sound in the audio range (between 20 Hz and 20 kHz) in accordance with an electrical signal placed across Speaker Coil 150. Additionally, Speaker Coil 150 is configured to function as, or as part of, an antenna for receiving electromagnetic waves in a high-frequency band. For example, Speaker Coil 150 may be configured to function as an antenna for electromagnetic waves in a frequency band comprising a range between 5 MHz and 30 MHz. Thus, the electrical signal across Speaker Coil 150 may be a superposition of driving low-frequency electrical signals in the audio range (20 Hz to 20 kHz) with received high-frequency signals (5 MHz to 30 MHz) due to the presence of electromagnetic radiation in the vicinity of Speaker Coil 150. It will be understood that although the following discussions refer to a speaker and a speaker coil, any sound transducer comprising a coil that produces sound in response to an electrical signal or produces an electrical signal in response to sound, such as a microphone, can be used.

Speaker Coil 150 is coupled to Filter 110, Amplifier 160, and Filter 130. Filter 110 is coupled to Wireless Power Receiver 111 which in turn is coupled to Charger 112. The output from Charger 112 is coupled to Battery 113. Charger 112 and Battery 113 are each coupled to System Bus 114. System Bus 114 distributes power to all of the system components in Wireless Headset 100.

Filter 110 is coupled to FM Transceiver 131 which is coupled to Microcontroller Unit (MCU) 140. Microcontroller Unit (MCU) 140 functions as the system controller and is coupled to Wireless Power Receiver 111, Charger 112, FM Transceiver 131, Pre-amplifier 171, and Amplifier 160.

Figure 2:
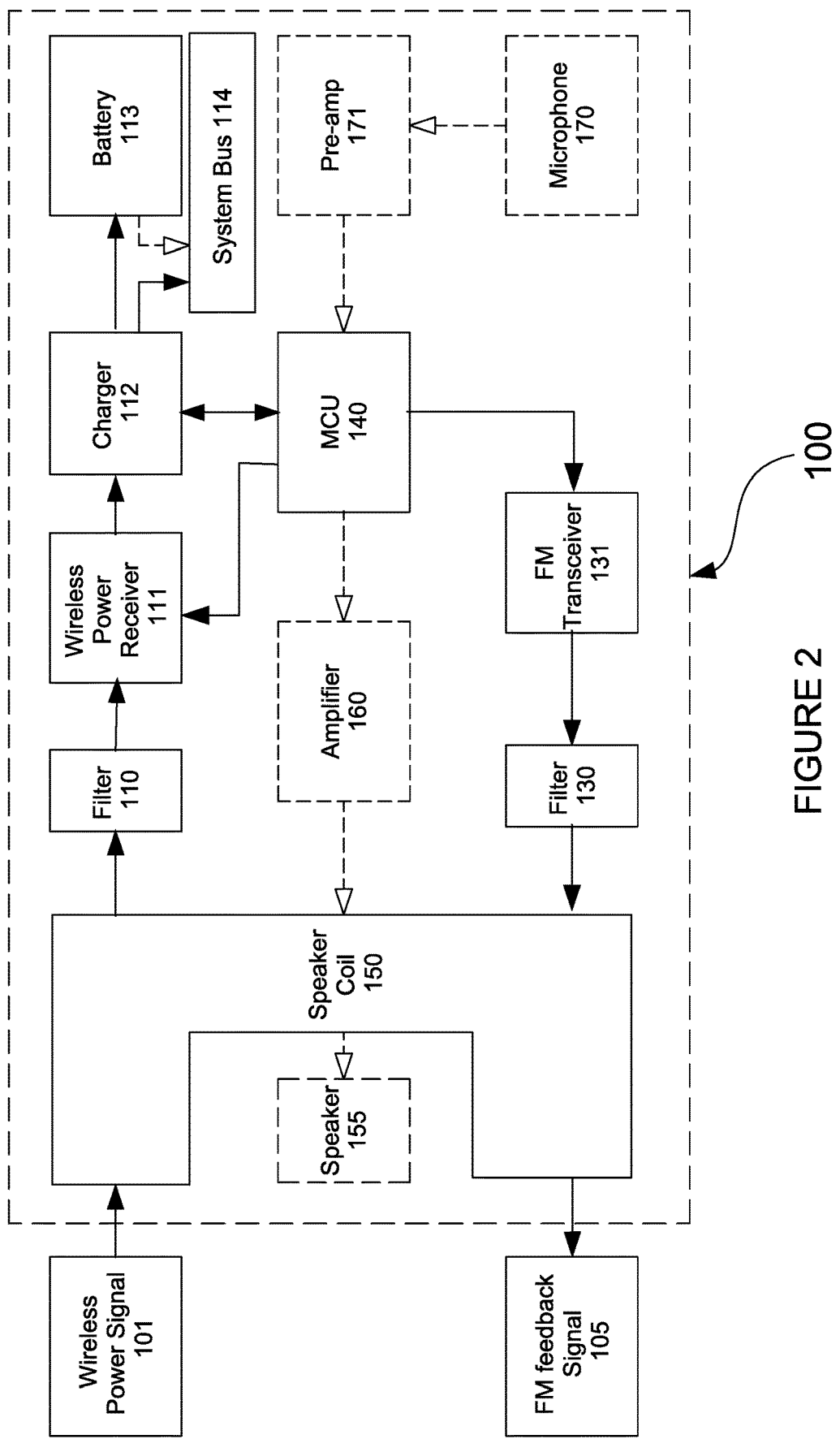
FIG. 2 is a schematic diagram illustrating a mode of operation of the wireless headset of FIG. 1.
Figure 3:
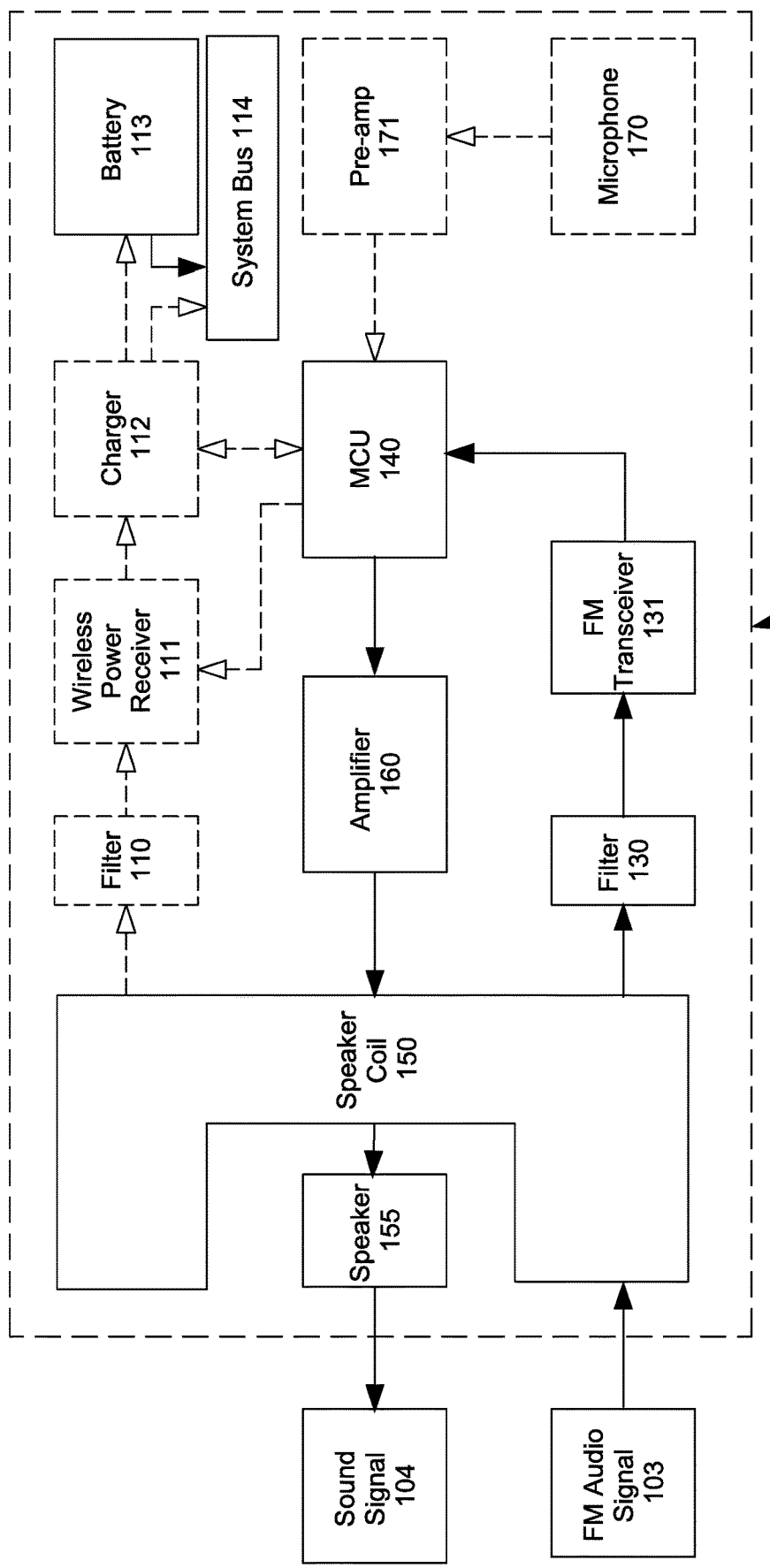
FIG. 3 is a schematic diagram illustrating another mode of operation of the wireless headset of FIG. 1.
Figure 4:
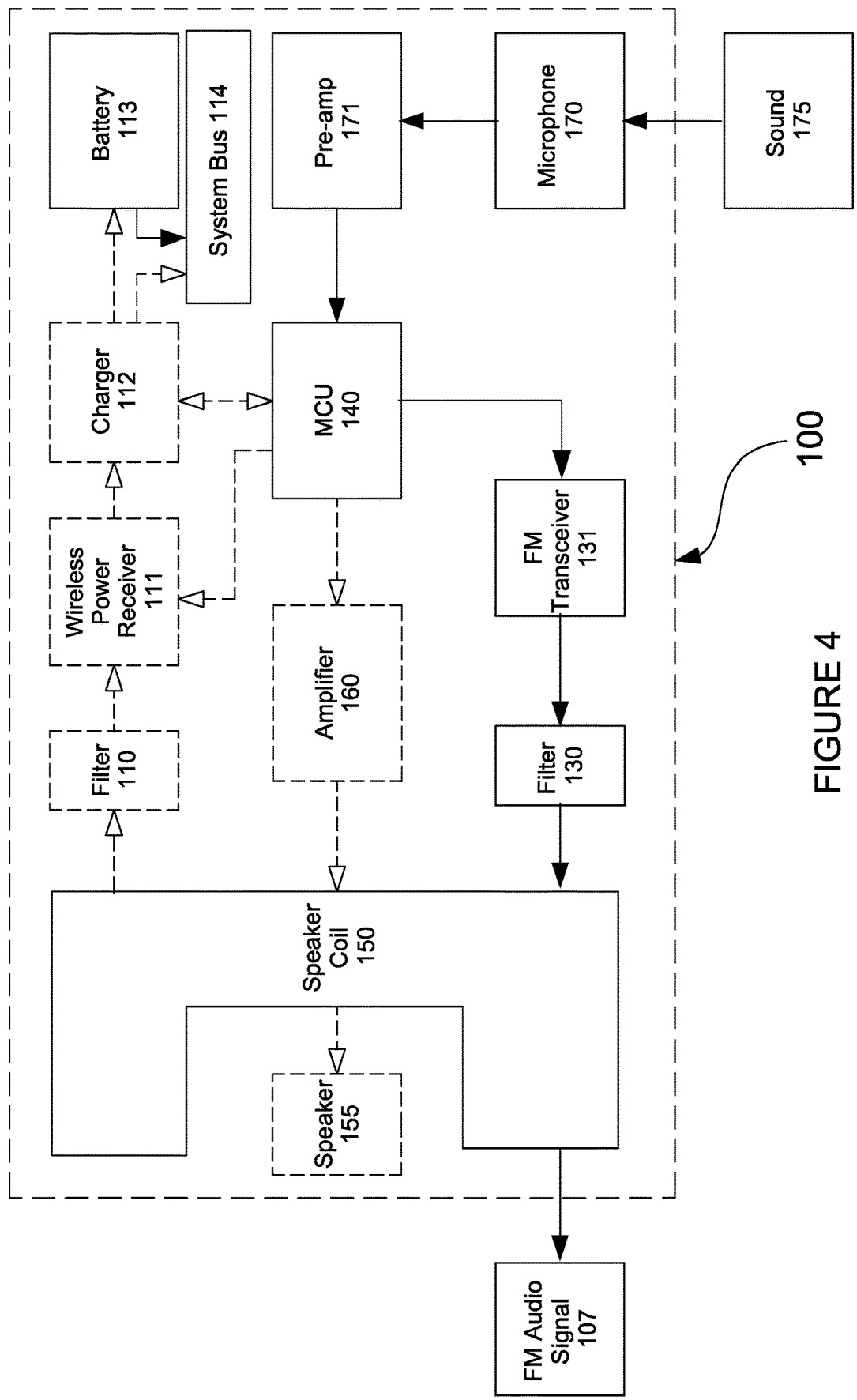
FIG. 4 is a schematic diagram illustrating another mode of operation of the wireless headset of FIG. 1.

Three different operating modes of Wireless Headset 100, designated as charge mode, audio receive mode, and audio transmit mode, will now be described in more detail. These three operating modes are illustrated in FIGS. 2, 3, and 4 respectively. FIGS. 2, 3, and 4 illustrate the same components that are illustrated in FIG. 1, except that unused system components and couplings are shown in dashed lines, and input signals are illustrated as appropriate for the operating mode being discussed. The following discussions refer to a frequency modulated signal to be used for transmitting from or receiving to FM Transceiver 131 for purposes of exchanging information with a remote transmitter or receiver. It will be understood that other forms of signal modulation and associated transceivers could also be used including, but not limited to, phase-shift keying, frequency-shift keying, amplitude modulation, amplitude-shift keying, on-off keying, quadrature amplitude modulation, and continuous phase modulation.

FIG. 2 illustrates the charge mode in which the Wireless Headset 100 may be removed from the user's head and placed onto a surface of a wireless power transmitter. The wireless power transmitter transmits a Wireless Power Signal 101 to Wireless Headset 100. Wireless power transmission may occur in the form of magnetic resonance. The frequency of Wireless Power Signal 110 will typically be 6.78 MHz; however, other transmission frequencies are also possible. Wireless Power Signal 101 is received by Speaker Coil 150 and coupled to Wireless Power Receiver 111 through Filter 110. Filter 110 passes power transmitting frequency (such as 6.78 MHz) and removes audio and other unwanted frequencies. Charger 112 uses the power received through Wireless Power Receiver 111 to charge Battery 113. In this mode of operation, Charger 112 supplies power to System Bus 114, which in turn distributes the power to the rest of the system. MCU 140 controls charging of Battery 113 by controlling Wireless Power Receiver 111 and Charger 112. MCU 140 also communicates with the wireless power transmitter by sending FM Feedback Signal 105 (typically at a frequency of 27 MHz) through FM Transceiver 131, Filter 130, and Speaker Coil 150. The information in the feedback signal may comprise battery status information such as whether or not the battery has reached full charge. In charging mode, Speaker Coil 150 acts as a receiving antenna for Wireless Power Signal 101 and a transmitting antenna for FM Feedback Signal 105.

FIG. 3 illustrates the audio receive mode for Wireless Headset 100 in which Wireless Headset 100 may receive an audio signal such as a voice or music audio signal. FM Transceiver 131 receives FM Audio Signal 103 from a remote client through Speaker Coil 150 and Filter 130. FM Transceiver 131 sends the received audio signal to MCU 140 which in turn sends the signal to Amplifier 160. Amplifier 160 causes Speaker Coil 150 to move a speaker diaphragm in Speaker 155, thus producing Sound Signal 104. In audio receive mode, Speaker Coil 150 acts as a receiving antenna for FM Audio Signal 103 and a transducer coil to operate Speaker 155 to create Sound Signal 104. In practice, FM Audio Signal 103 is likely to be broadcast with a center frequency of 27 MHz. Other broadcast frequencies are possible; however, 27 MHz is a practical broadcasting frequency because existing standards typically allow for side-bands at 27 MHz which are wide enough to support high-quality music transmission.

FM Audio Signal 103 which is received by Speaker Coil 150 is passed on to FM Transceiver 131 through Filter 130. Filter 130 may be a notch filter configured to pass an FM signal transmitting frequency (such as 27 MHz) and its sidebands and to remove audio and other unwanted frequencies. Filter 130 may be designed to remove a frequency of resonant power transmission (such as 6.78 MHz). FM Transceiver 131 then passes the received audio (e.g. music) signal to MCU 140 which then creates a Sound Signal 104 (e.g. music) via Amplifier 160 and Speaker Coil 150. It should be noted that in the here-to-fore mentioned audio receive mode, Speaker Coil 150 functions simultaneously as the coil of wire in a loud-speaker and as an FM signal antenna as indicated in FIG. 3 by the presence of Sound Signal 104 simultaneously with FM Audio Signal 103. The ability of Speaker Coil 150 to function in two roles simultaneously is enabled by Filter 130 which filters out audio frequencies from reaching FM Transceiver 131. In some embodiments, the Wireless Headset 100 can be trickle charged in audio receive mode.

FIG. 4 illustrates the audio transmit mode in which the Wireless Headset 100 may transmit sound picked up by a microphone attached to the Wireless Headset 100. More specifically, Microphone 170 receives Sound 175 and generates a corresponding electrical signal that is sent to Pre-amplifier 171. Pre-amplifier 171 sends the electrical signal to MCU 140. MCU 140 then sends the electrical signal to FM Transceiver 131 which transmits a corresponding transmission signal using frequency modulation through antenna Speaker Coil 150. The resulting transmission signal is illustrated as FM Audio Signal 107. In practice, FM Audio Signal 107 will typically be broadcast at a center frequency of 27 MHz; however, other broadcast frequencies are possible. In audio transmission mode, Speaker Coil 150 acts as an FM broadcasting antenna.

Figure 5:
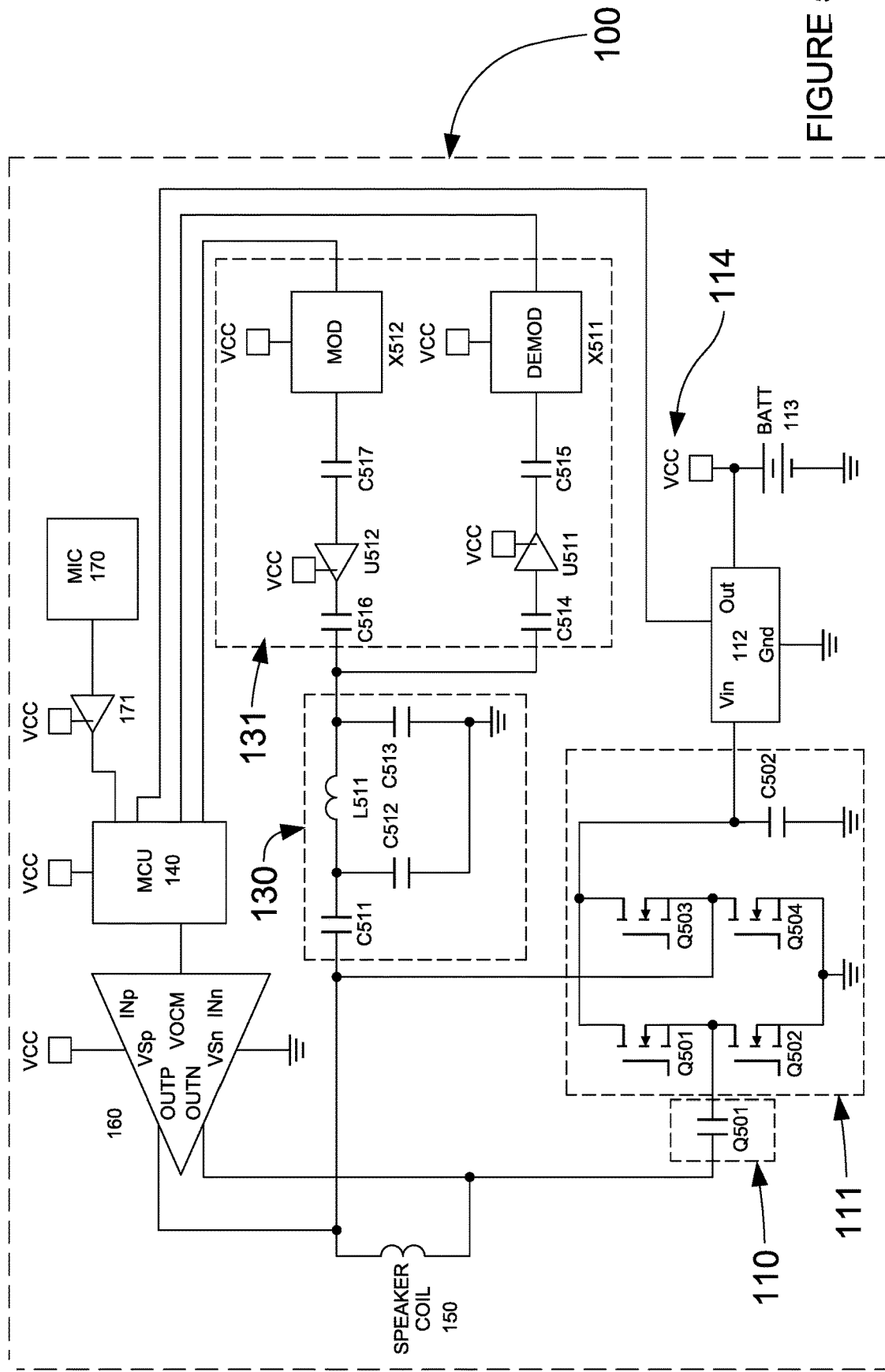
FIG. 5 is a circuit diagram of the wireless headset of FIG. 1.

Turning now to FIG. 5, illustrated is a circuit diagram of here-to-fore described Wireless Headset 100 of FIGS. 1-4. Speaker Coil 150 is coupled to Filter 110 which comprises Capacitor C501. Capacitor C501 is configured to form a resonance with Speaker Coil 150 at a frequency equal to a frequency of wireless power transmission (such as 6.78 MHz). Filter 110 is coupled to Wireless Power Receiver 111 which comprises Output Capacitor C502 and a full-bridge comprising high-speed semiconductor switches Q501, Q502, Q503, and Q504. Semiconductor Switches Q501, Q502, Q503, and Q504 may be Gallium-Nitride Enhancement Mode Power Transistors.

Other configurations are possible for Wireless Power Receiver 111, such as, but not limited to, a full-wave diode bridge in series with a capacitor that resonates with Speaker Coil 150 at the frequency of the wireless power transmission. In choosing components for Wireless Power Receiver 111, it is important that the components are configured to rectify the voltage across Speaker Coil 150 and that the net input impedance of Wireless Power Receiver 111 combined with Filter 110 resonates with Speaker Coil 150 at the frequency of the wireless power transmission.

When wireless power is being received by Wireless Headset 100, Semiconductor Switches Q501, Q502, Q503, and Q504 will typically be driven at a frequency equal to a frequency of the wireless power transmission (such as 6.78 MHz). These switches may be driven such that Semiconductor Switches Q501 and Q504 are driven simultaneously with a pulse-width modulated duty cycle slightly less than 50% and Semiconductor Switches Q502 and Q503 are driven simultaneously with a pulse-width modulated duty cycle slightly less than 50% and 180 degrees out-of-phase with respect to Semiconductor Switches Q501 and Q504. The output from the full-bridge comprising Semiconductor Switches Q501, Q502, Q503, and Q504 acts as an active rectifier for wireless transmitted power, and therefore charges Output Capacitor C502 to a DC voltage. Gate drives for Semiconductor Switches Q501, Q502, Q503, and Q504 can be enabled or disabled by a connection to MCU 140.

Charger 112 takes power from Output Capacitor C502 to regulate the voltage across Battery 113 in such a way as to charge Battery 113. Charging may typically be controlled by MCU 140. The output from Charger 112 is coupled to Battery 113, and both Charger 112 and Battery 113 may be coupled to System Bus 114 which is also labeled as VCC in FIG. 5. As can be seen in FIG. 5, a VCC node is also coupled to MCU 140, Pre-amplifier 171, Amplifier 160, Amplifier U511, Amplifier U512, Modulator X512, and Demodulator X511. All of these here-to-for mentioned modules can therefore be powered either directly from Battery 113 or from Charger 112.

Speaker Coil 150 is also coupled to Filter 130 which comprises Capacitors C511, C512, and C513 as well as Inductor L511. The purpose of Filter 130 is to filter out any frequencies outside of a transmitted FM signal frequency and its side bands (for example any frequencies outside of 26.7 MHz to 27.3 MHz). Filter 130 also filters out any audio-frequency signals (20 Hz to 20 kHz) and any frequencies of resonant power transmission (such as 6.78 MHz). Capacitor C511 acts as a low-frequency blocking capacitor that filters out all audio-frequencies (20 Hz to 20 kHz). Capacitor C512, Capacitor C513, and Inductor L511 act as a notch filter tuned to the center frequency of FM signal transmission (such as 27 MHz). This notch filter also filters out any frequencies of resonant power transmission (such as 6.78 MHz). It should be appreciated that many other filter combinations are possible to accomplish the task of blocking voice signals, blocking wireless power transmission, and allowing FM signal transmission at a particular frequency.

Filter 130 is coupled to FM Transceiver 131. FM Transceiver 131 can both transmit and receive frequency-modulated signals. The transmitting section of FM Transceiver 131 comprises Modulator X512, AC Coupling Capacitor C517, Amplifier U512, and AC Coupling Capacitor C516. Modulator X512 mixes the signal to be transmitted from MCU 140 with a carrier frequency. The resulting FM modulated signal is coupled to amplifier U512 via AC Coupling Capacitor C517. AC Coupling Capacitor C516 couples the output from Amplifier U512 to Filter 130 which in turn couples the frequency-modulated signal to Speaker Coil 150. Speaker Coil 150 acts as a transmitting antenna for the frequency-modulated signal.

The receiving section of FM Transceiver 131 comprises AC Coupling Capacitor C514, Amplifier U511, AC Coupling Capacitor C515, and Demodulator X511. Capacitor C514 couples the output from Filter 130 to Amplifier U511. Amplifier U511 amplifies the signal and couples it to Demodulator X511 via AC Coupling Capacitor C515. Demodulator X511 demodulates the FM signal, reducing the signal frequency by the carrier frequency.

When an FM signal is received by Speaker Coil 150, the FM signal is filtered by Filter 130, Demodulated by FM Transceiver 131, and sent to MCU 140. MCU 140 couples the resulting demodulated signal to Amplifier 160 which in turn drives the loud speaker through Speaker Coil 150.

When the Wireless Headset 100 is used in audio transmit mode, Microphone 170 receives incoming sound signals and generates a corresponding electrical signal which is then amplified by Pre-amplifier 171 and subsequently sent to MCU 140. MCU 140 sends the appropriate signal (sound signal for audio transmitting mode or charging feedback for charging mode) to FM Transceiver 131 which then broadcasts a corresponding transmission signal through Speaker Coil 150.

Figure 6:
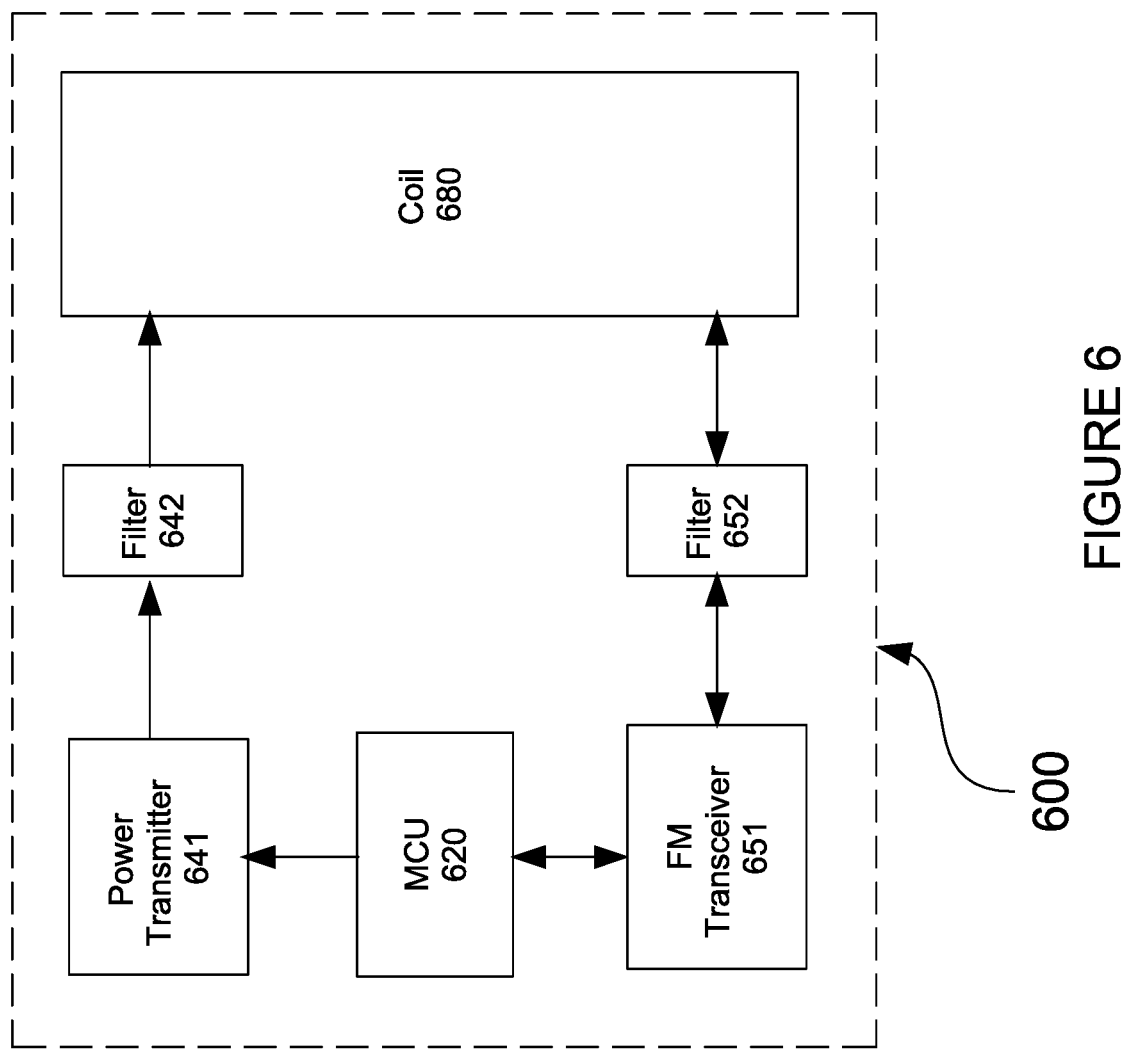
FIG. 6 is a schematic diagram of a wireless transmitter constructed in accordance with another embodiment of the invention.

Turning now to FIG. 6, illustrated is a schematic diagram of a wireless transmitter 600 configured to be used with Wireless Headset 100 of FIGS. 1-5. Wireless Transmitter 600 comprises MCU 620 coupled to FM Transceiver 651 and to Power Transmitter 641. Power Transmitter 641 and FM Signal Transmitter 651 are each coupled to Coil 680 via Filters 642 and 652, respectively.

Figure 7:
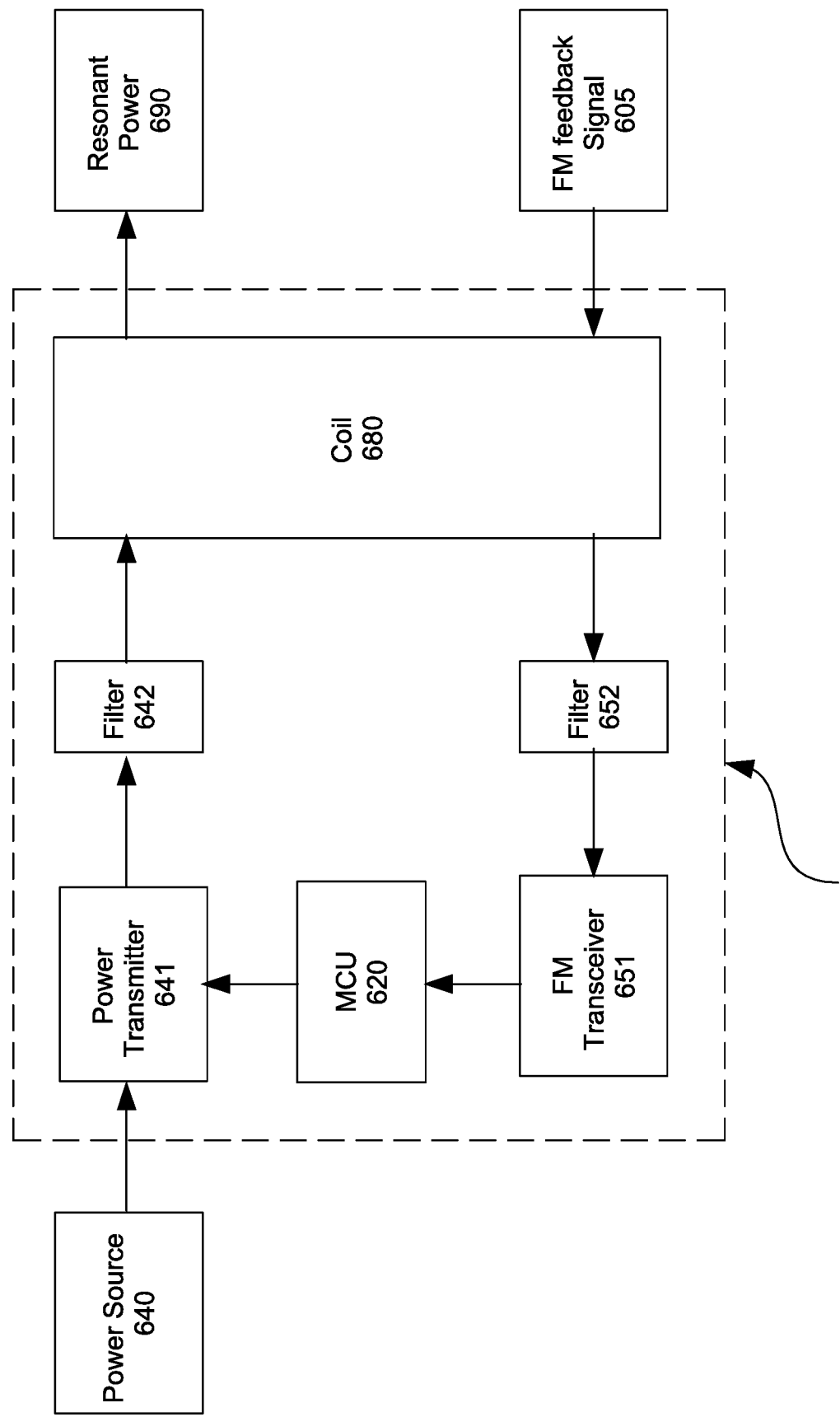
FIG. 7 is a schematic diagram illustrating a mode of operation of the wireless transmitter of FIG. 6.
Figure 8:
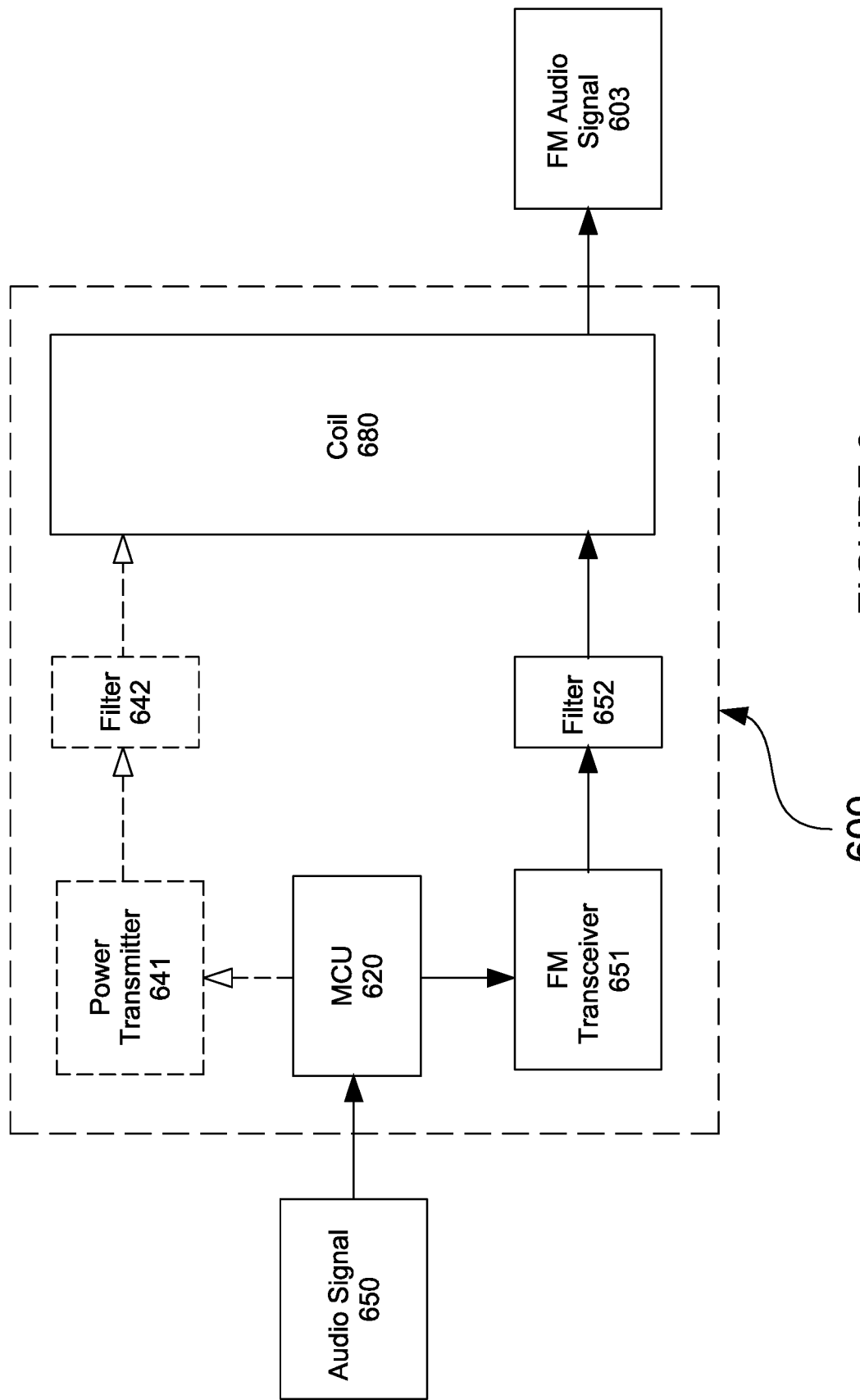
FIG. 8 is a schematic diagram illustrating another mode of operation of the wireless transmitter of FIG. 6.
Figure 9:
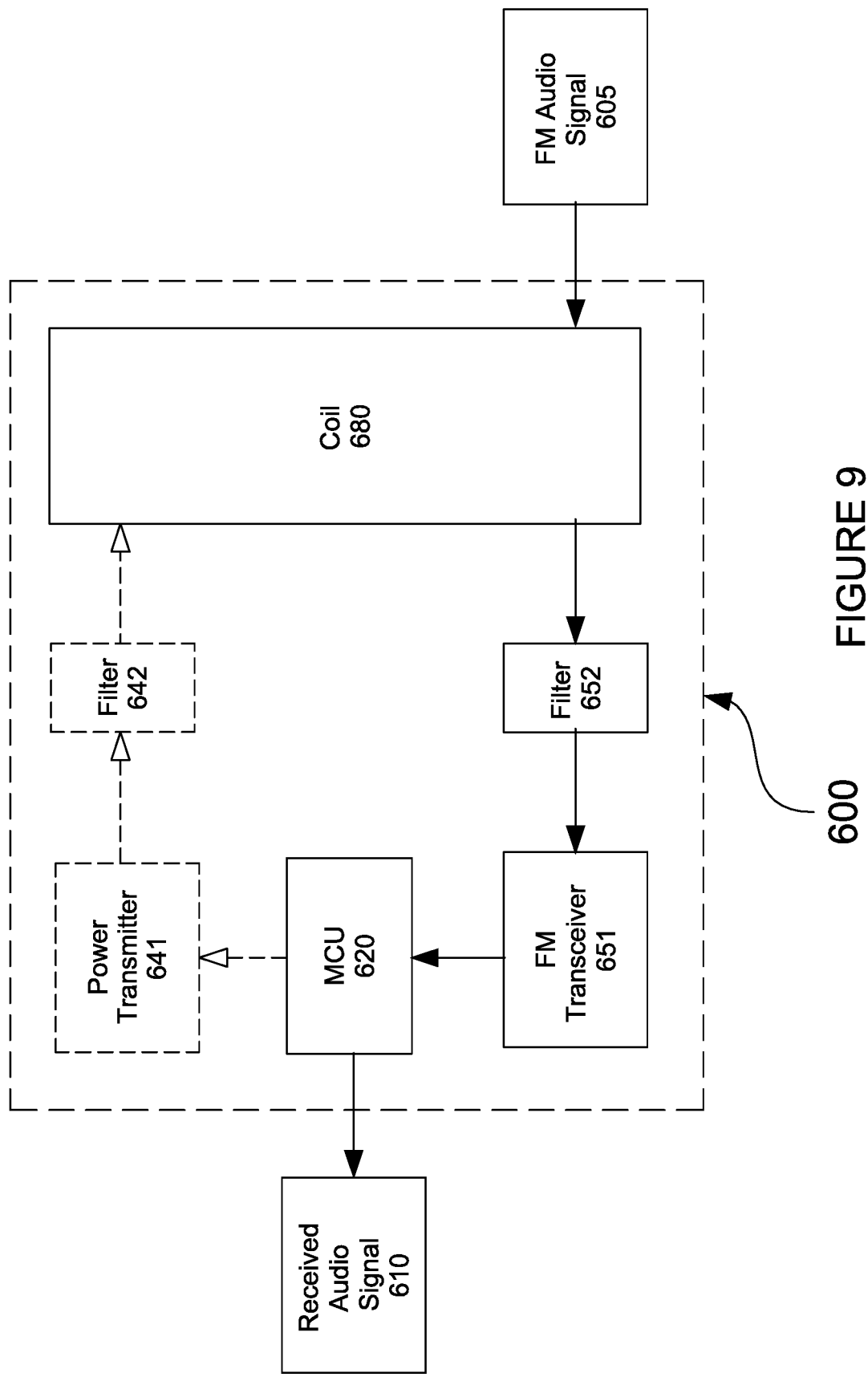
FIG. 9 is a schematic diagram illustrating another mode of operation of the wireless transmitter of FIG. 6.

There are three different operating modes for Wireless Transmitter 600 which correspond to the three different operating modes of the here-to-for described Wireless Headset 100 and which will be designated as charging mode, audio receiving mode, and audio transmit mode. It should be appreciated that despite the naming of the three modes as charging mode, audio receiving mode, and audio transmit mode, each of these modes is not limited only to the function described by the name of the mode. These three operating modes are illustrated in FIGS. 7, 8, and 9 respectively. FIGS. 7, 8, and 9 illustrate the same schematic diagrams that are illustrated in FIG. 6, except that unused system components and couplings shown in dashed lines, and input signals are illustrated as appropriate for the operating mode being discussed.

FIG. 7 illustrates charging mode for Wireless Transmitter 600. Power Source 640 provides power to Power Transmitter 641. Power source 640 could for example be a USB power port or an AC-to-DC power supply coupled to the electric grid. Power Transmitter 641 transmits resonant wireless power through Coil 680 at a frequency above 1 MHz, for example at 6.78 MHz. Power Transmitter 641 transmits resonant power through Coil 680 but also uses Coil 680 to receive FM Feedback Signal 605 as a frequency-modulated signal. FM Feedback Signal 605 contains information from the device receiving the charging power (such as Wireless Headset 100 in FIGS. 1-4). FM Feedback Signal 605 may contain information about end-of-charge cycle for a battery in a wireless headset. The information contained in FM Feedback Signal 605 is sent to MCU 620 via Filter 652 and FM Transceiver 651.

Coil 680 may typically comprise a trace on a PCB such as is typically used by resonant power transmission devices. FIG. 7 illustrates a common Coil 680 used for both wireless power transmission and FM signal transmission/reception; however, separate coils could also be used for each of these two functions.

Filters 642 and 652 simultaneously allow FM signal transmission/reception and wireless power transmission through Coil 680 by filtering out frequencies of the opposing function. For example, if wireless power transmission occurs at 6.78 MHz and the FM transmission occurs at 27 MHz, Filter 642 will filter out 27 MHz and pass 6.78 MHz while Filter 652 will filter out 6.78 MHz and pass 27 MHz.

FIG. 8 illustrates audio transmit mode in which Audio Signal 650 is an electrical signal representing an audio signal of, for example, voice or music. MCU 620 sends the electrical signal to FM Transceiver 651 which frequency-modulates the electrical signal and transmits a corresponding transmission signal via Filter 652 and Coil 680 as FM Audio Signal 603.

FIG. 9 illustrates audio receive mode in which FM Audio Signal 605 is received by Coil 680, filtered by Filter 652, demodulated by FM Transceiver 651, and then sent to MCU 620. MCU 620 sends the demodulated signal as Received Audio signal 610 to an external device such as a phone or computer.

It is critical that Speaker Coil 150 (shown in FIGS. 1-4) not only provide standard speaker functionality, but that it also allows reception of wireless power (typically at 6.78 MHz) and reception of a high-frequency FM signal (typically at a center frequency of 27 MHz). To accomplish this wide range of functionality for Speaker Coil 150, it must be constructed so that high frequencies (e.g. 5 MHz-30 MHz) are not significantly attenuated within the coil/magnet structure and so that Speaker Coil 150 will resonate at the appropriate frequency (e.g. 6.78 MHz or 27 MHz) when connected to appropriate external components.

Figure 10A:
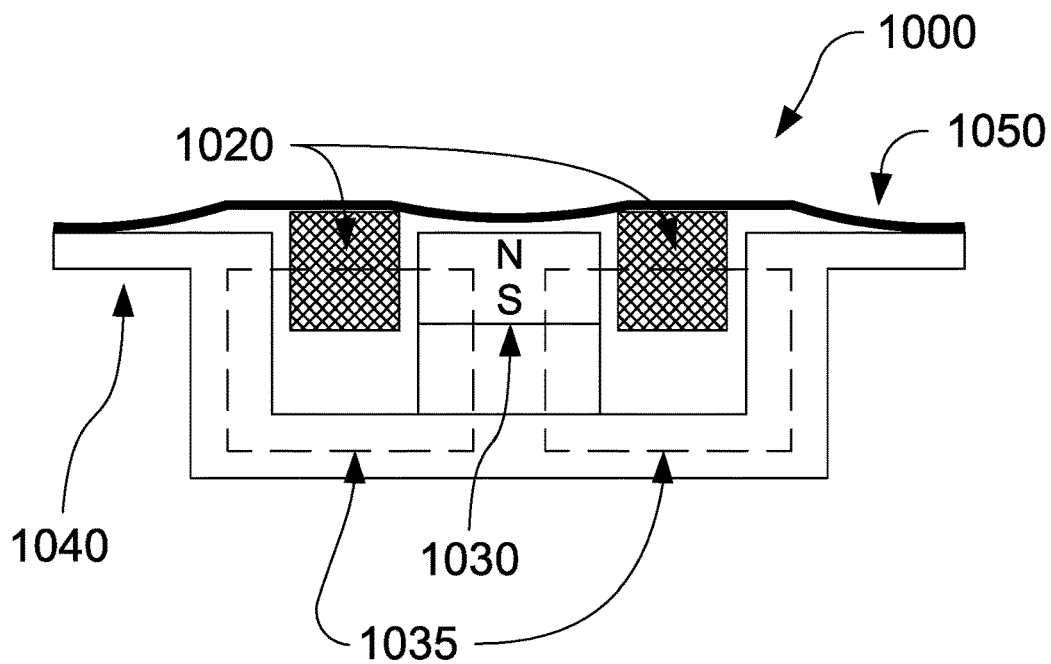
FIG. 10A is an elevation cutaway view of a speaker coil constructed in accordance with another embodiment of the invention.
Figure 10B:
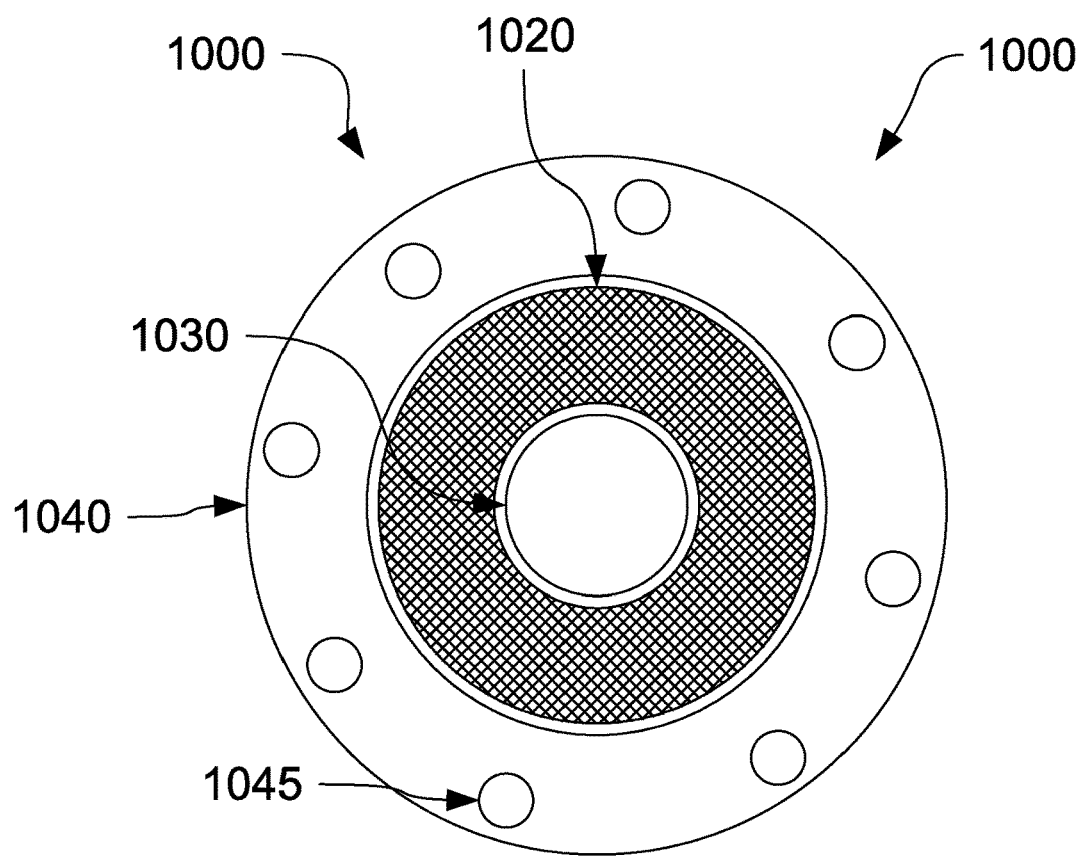
FIG. 10B is a plan cutaway view of the speaker coil of FIG. 10A.

FIGS. 10A and 10B illustrate an embodiment of a construction for Speaker 1000 that can be used for operating a headset loudspeaker and for transmitting or receiving FM signals or receiving resonant power. FIG. 10A illustrates an elevation cross-sectional view of Speaker 1000 while FIG. 10B illustrates a plan view of Speaker 1000 with diaphragm 1050 removed to expose underlying components.

Permanent Magnet 1030 is affixed to Base 1040. Base 1040 comprises a ferromagnetic substance which may have minimal or no conductivity such as a ferrite or ferromagnetic insulator. Permanent Magnet 1030 is configured with a magnetization along its vertical axis—for example, with magnetic north (illustrated by "N" in FIG. 10A) on top and magnetic south (illustrated by "S" in FIG. 10A) on the bottom. Magnetic flux produced by Permanent Magnet 1030 traverses Path 1035 through Base 1040 and Coil 1020. Diaphragm 1050 is a flexible membrane and is affixed in its center to Coil 1020. Diaphragm 1050 is also affixed along its outermost edge to Base 1040.

Changes in current flowing through Coil 1020 induce a force on Coil 1020 with respect to Permanent Magnet 1030, thus causing movement of Coil 1020. The movement of Coil 1020 is transferred to Diaphragm 1050 which produces sound in accordance with its movement. Holes 1045 in Base 1040 provide pressure relief for Diaphragm 1050 to enable greater movement for a given amount of force.

Speaker 1000 is thus able to convert electrical signals to sound. Coil 1020 may also act as an antenna to receive either frequency-modulated signals or resonant power. The use of a minimally-conductive material (such as ferrite) or non-conductive material (such as a ferromagnetic insulator) in Base 1040 allows high-frequency signals to be received by Coil 1020 with minimal attenuation. Permanent Magnet 1030 causes a fixed flux density within parts of Base 1040 that reside within Path 1035. The thickness of Base 1040 may be optimally sized to cause the fixed level of flux density along Path 1035 to be close to the level of flux density required to saturate the ferromagnetic material used in Base 1040. Causing the ferromagnetic material used in Base 1040 to be nominally magnetically saturated reduces the effect of Base 1040 on reception of frequency-modulated signals or resonant power by Coil 1020.

Figure 11A:
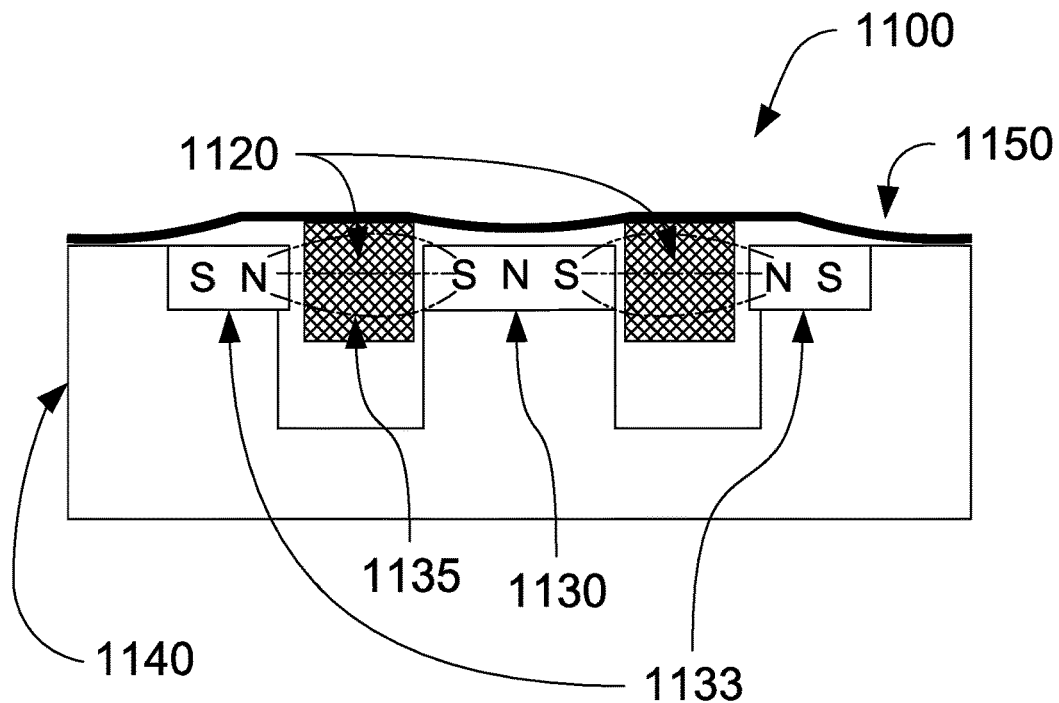
FIG. 11A is an elevation cutaway view of a speaker coil constructed in accordance with another embodiment of the invention.
Figure 11B:
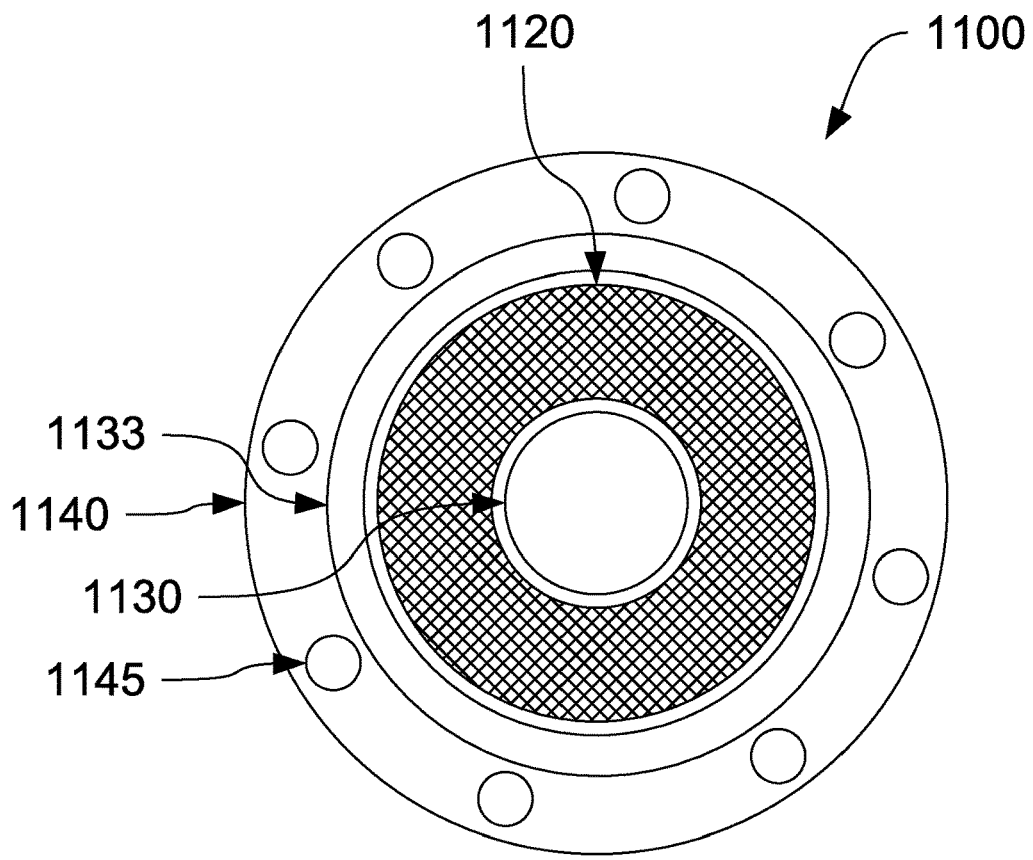
FIG. 11B is a plan cutaway view of the speaker coil of FIG. 11B.

FIGS. 11A and 11B illustrate another embodiment of a construction for a speaker that can be used for operating a headset loudspeaker and for receiving FM signals or resonant power. FIG. 11A illustrates a cross-sectional perspective of Speaker 1100 while FIG. 11B illustrates a top-view perspective of Speaker 1100 with diaphragm 1150 removed to expose underlying components.

Permanent Magnets 1130 and 1133 are affixed to Base 1140. Permanent Magnet 1130 is rod shaped and configured with a radial magnetization—for example, with magnetic north (illustrated by "N" in FIG. 11A) in the center and magnetic south (illustrated by "S" in FIG. 11A) on the outer rim. Permanent Magnet 1133 is a cylinder, also radially magnetized as shown by the north "N" and south "S" poles illustrated in FIG. 11A. Base 1140 comprises a non-conductive, non-ferromagnetic substance such as plastic. Magnetic flux produced by Permanent Magnet 1130 traverses Path 1135 through Coil 1120. The return flux path from the center of Permanent Magnet 1130 to the outer rim of Permanent Magnet 1135 is partly through the air and thus is not illustrated in FIG. 11A.

Diaphragm 1150 is a flexible membrane and is affixed in its center to Coil 1120. Diaphragm 1150 is also affixed along its outermost edge to Base 1140.

Changes in current flowing through Coil 1120 induce a force on Coil 1120 with respect to Permanent Magnets 1130 and 1133, thus causing movement of Coil 1120. The movement of Coil 1120 is transferred to Diaphragm 1150 which produces sound in accordance with its movement. Holes 1145 in Base 1140 provide pressure relief for Diaphragm 1150 to enable greater movement for a given amount of force.

Speaker 1100 is thus able to convert electrical signals to sound. Coil 1120 may also act as an antenna to receive either frequency-modulated signals or resonant power. The use of non-conductive non-ferromagnetic material in Base 1140 allows high-frequency signals to be received by Coil 1120 with no attenuation.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof. As an example, a microphone coil could be used as an antenna rather than using a speaker coil. As another example, other forms of signal modulation could be used instead of frequency modulation. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A wireless headset comprising:
    a sound transducer having:
        a sound transducer coil configured to at least one of convert a first electrical signal to a first sound signal and convert a first sound signal to a first electrical signal comprising first audio information,
        a first radially-magnetized permanent magnet with a cross-section located within an inner circumference of said sound transducer coil, and
        a second radially-magnetized permanent magnet with a cross-section surrounding said sound transducer coil such that a magnetic polarity of the first radially-magnetized permanent magnet's outer circumference has opposite polarity of the second radially-magnetized permanent magnet's inner circumference; and
    a wireless power receiver having an antenna comprising said sound transducer coil, said wireless power receiver configured to receive wireless power via said sound transducer coil.

2. The wireless headset of claim 1, further comprising a transceiver configured to transmit and receive a modulated signal via said sound transducer coil.

3. The wireless headset of claim 2, further comprising a rechargeable battery configured to be charged from said wireless power receiver.

4. The wireless headset system of claim 3, wherein the modulated signal includes a status of the battery.

5. The wireless headset of claim 2, wherein the transceiver is configured to adjust via the modulated signal a transmitted level of power of a wireless power transmitter.

6. The wireless headset of claim 2, wherein the modulated signal has a fundamental frequency of 27 MHz.

7. The wireless headset of claim 2, further comprising a microphone such that the transmitted signal at least partially represents sound produced in the vicinity of the microphone.

8. The wireless headset of claim 1, further comprising a filter configured to resonate with said sound transducer coil at a transmission frequency of said wireless power.

9. The wireless headset of claim 1, wherein the wireless power receiver is configured to receive wireless power transmitted at a frequency of 6.78 MHz.

10. The wireless headset of claim 1, wherein each of the first radially-magnetized permanent magnet and the second radially-magnetized permanent magnet is formed of a ferromagnetic material and a magnetic flux path through said radially-magnetized permanent magnet and said sound transducer coil such that the magnetic flux path is closed through said ferromagnetic material.

11. The wireless headset of claim 10, wherein the ferromagnetic material comprises ferrite or a ferromagnetic insulator.

12. The wireless headset of claim 10, wherein the ferromagnetic material is configured such that magnetic flux produced by one of said first radially-magnetized permanent magnet and said second radially-magnetized permanent magnet is high enough to cause the ferromagnetic material to have a flux density close to or exceeding a magnetic flux density saturation level of the ferromagnetic material.

13. The wireless headset of claim 1, wherein the first and second radially-magnetized permanent magnets are affixed to a structure formed of a non-conductive and non-ferromagnetic substance.

14. A wireless headset comprising:
   a sound transducer having:
      a sound transducer coil configured to at least one of convert a first electrical signal to a first sound signal and convert a first sound signal to a first electrical signal comprising first audio information,
      a first radially-magnetized permanent magnet with a cross-section located within an inner circumference of said sound transducer coil, and
      a second radially-magnetized permanent magnet with a cross-section surrounding said sound transducer coil such that a magnetic polarity of the first radially-magnetized permanent magnet's outer circumference has opposite polarity of the second radially-magnetized permanent magnet's inner circumference; and
   a transceiver having an antenna comprising said sound transducer coil, said transceiver configured to transmit and receive a modulated signal via said sound transducer coil.

15. The wireless headset of claim 14, further comprising a notch filter configured to pass a small band of frequencies centered at a center frequency of said modulated signal.

16. The wireless headset of claim 14, wherein the modulated signal comprises a center frequency of 27 MHz.

17. A wireless headset system comprising:
   a wireless headset comprising:
      a sound transducer having:
         a sound transducer coil configured to convert a first electrical signal to a first sound signal comprising first audio information,
         a first radially-magnetized permanent magnet with a cross-section located within an inner circumference of said sound transducer coil, and
         a second radially-magnetized permanent magnet with a cross-section surrounding said sound transducer coil such that a magnetic polarity of the first radially-magnetized permanent magnet's outer circumference has opposite polarity of the second radially-magnetized permanent magnet's inner circumference; and
      a wireless power receiver having a first antenna comprising said sound transducer coil, said wireless power receiver configured to receive wireless power via said sound transducer coil; and
   a wireless transmitter configured to transmit said wireless power to said wireless power receiver.

18. The wireless headset system of claim 17, wherein the wireless transmitter is further configured to at least one of transmit and receive modulated signals, said wireless headset further comprising a transceiver configured to transmit and receive modulated signals via said sound transducer coil.

19. The wireless headset system of claim 18, wherein the wireless transmitter further includes a second antenna, said wireless transmitter being further configured to transmit said wireless power and said modulated signals via said second antenna.

* * * * *